United States Patent
Engle et al.

[11] Patent Number: 5,889,507
[45] Date of Patent: *Mar. 30, 1999

[54] MINIATURE ISOMETRIC JOYSTICK

[75] Inventors: T. Scott Engle, Tualatin; Patrick J. Franz, Portland, both of Oreg.

[73] Assignee: InControl Solutions, Inc.

[ * ] Notice: The term of this patent shall not extend beyond the expiration date of Pat. No. 5,541,622.

[21] Appl. No.: 685,486

[22] Filed: Jul. 24, 1996

Related U.S. Application Data

[63] Continuation of Ser. No. 104,777, Aug. 9, 1993, Pat. No. 5,541,622, which is a continuation-in-part of Ser. No. 96,485, Jul. 22, 1993, abandoned, which is a division of Ser. No. 557,546, Jul. 24, 1990, Pat. No. 5,231,386.

[51] Int. Cl.$^6$ .................................................. G09G 5/08
[52] U.S. Cl. ............................................ 345/161; 345/168
[58] Field of Search .................................... 345/156, 157, 345/160, 161, 168, 184; 200/5 A, 6 A, 511, 513, 333, 302.2, 341–345, 517, 521, 522; 338/99, 114, 128; 74/471 XY, 553; 341/20, 22, 27, 34; 318/640; 400/490, 491, 491.3, 495

[56] References Cited

U.S. PATENT DOCUMENTS

| | | | |
|---|---|---|---|
| 3,317,698 | 5/1967 | Mansfield | 200/333 |
| 3,849,611 | 11/1974 | Walker, Jr. | 200/5 A |
| 3,921,166 | 11/1975 | Volpe | 345/168 |
| 4,029,915 | 6/1977 | Ojima | 200/5 A |
| 4,045,650 | 8/1977 | Nestor | 200/511 |
| 4,050,265 | 9/1977 | Drennen et al. | 74/553 |
| 4,158,117 | 6/1979 | Quilliam et al. | 341/34 |
| 4,163,204 | 7/1979 | Sado et al. | 338/114 |
| 4,246,452 | 1/1981 | Chandler | 200/5 A |
| 4,313,113 | 1/1982 | Thronburg | 345/159 |
| 4,314,227 | 2/1982 | Eventoff | 338/99 |
| 4,343,973 | 8/1982 | Main | 200/5 A |
| 4,394,548 | 7/1983 | Dola | 200/6 A |
| 4,406,931 | 9/1983 | Dola | 200/6 A |
| 4,408,103 | 10/1983 | Smith, III | 200/6 A |
| 4,410,872 | 10/1983 | Stecher et al. | 338/114 |
| 4,439,648 | 3/1984 | Reiner et al. | 200/6 A |
| 4,486,629 | 12/1984 | Sledesky | 200/6 A |
| 4,493,219 | 1/1985 | Sharp et al. | 200/6 A |

(List continued on next page.)

FOREIGN PATENT DOCUMENTS 78209030  9/1990  China .

OTHER PUBLICATIONS

IBM Tech. Disclosure, Split Keyboard, V. 29, No. 7, p.3110, Dec. 1986.

IBM Tech Disclosure, Smart Key, V. 28, No. 5, pp. 1859–1860, Oct. 1985.

J.D. Rutledge, T. Selker, force–toMotion Functions for Pointing, Human–Computer Interaction O Interact '90, pp. 701–706, IBM T. J. Watson Reasearch Center, Yorktown, N. W., 1990.

*Primary Examiner*—Chanh Nguyen
*Attorney, Agent, or Firm*—Marger Johnson & McCollom

[57] ABSTRACT

A miniature isometric joystick is disclosed for receiving manual user input to effect directional control such as controlling cursor movement on a computer display screen or controlling movement of an apparatus such as a machine or robot. The joystick is arranged to fit between the existing keys in a computer keyboard. The joystick includes a preloading spring for compressing the assembly together, thereby biasing the force sensors so as to neutralize manufacturing variations and control electrical and mechanical null zones. An integrated switch is provided in the joystick for detecting an external force applied by the user's fingertip. The switch unobtrusively detects when a user is pointing, thereby allowing a control system to measure pointing system bias signals while the user is not pointing. This permits the control system to automatically correct for drift, without requiring additional keyboard space for a separate switch to enable the pointing device.

8 Claims, 6 Drawing Sheets

U.S. PATENT DOCUMENTS

| | | | |
|---|---|---|---|
| 4,584,510 | 4/1986 | Hollow | 318/584 |
| 4,649,784 | 3/1987 | Fulks et al. | 84/690 |
| 4,680,577 | 7/1987 | Straayer et al. | 345/160 |
| 4,719,455 | 1/1988 | Louis | 345/184 |
| 4,734,034 | 3/1988 | Maness et al. | 433/68 |
| 4,745,301 | 5/1988 | Michalchik | 307/119 |
| 4,780,701 | 10/1988 | Eppinger | 338/196 |
| 4,786,768 | 11/1988 | Langewis et al. | 200/6 A |
| 4,793,193 | 12/1988 | Borgudd | 338/99 |
| 4,794,366 | 12/1988 | Sakamoto | 338/114 |
| 4,816,200 | 3/1989 | Stecher et al. | 264/59 |
| 4,818,828 | 4/1989 | Curley et al. | 200/5 A |
| 4,821,013 | 4/1989 | Iida | 338/99 |
| 4,825,019 | 4/1989 | Fisher | 200/6 A |
| 4,847,586 | 7/1989 | Tanaga et al. | 338/114 |
| 4,849,583 | 7/1989 | Meyer | 338/128 |
| 4,851,626 | 7/1989 | Nagashima | 200/513 |
| 4,856,993 | 8/1989 | Maness et al. | 433/68 |
| 4,864,272 | 9/1989 | Cecchi et al. | 338/128 |
| 4,874,549 | 10/1989 | Michalchik | 252/511 |
| 4,896,003 | 1/1990 | Hsieh | 200/6 A |
| 4,897,629 | 1/1990 | Lecklider | 338/114 |
| 4,920,237 | 4/1990 | Eardley et al. | 200/5 A |
| 4,933,660 | 6/1990 | Wynne, Jr. | 338/114 |
| 4,947,461 | 8/1990 | Yoshioda et al. | 200/6 A |
| 4,951,985 | 8/1990 | Pong et al. | 293/102 |
| 5,034,574 | 7/1991 | Martovitz | 200/6 A |
| 5,172,114 | 12/1992 | Bedoya et al. | 341/34 |
| 5,231,386 | 7/1993 | Brandenburg et al. | 345/174 |
| 5,252,821 | 10/1993 | Sugimura | 345/161 |
| 5,311,175 | 5/1994 | Waldman | 341/34 |
| 5,413,358 | 5/1995 | Austin, Jr. et al. | 200/302.2 |
| 5,521,596 | 5/1996 | Selker et al. | 345/161 |
| 5,541,622 | 7/1996 | Engle et al. | 345/161 |
| 5,579,033 | 11/1996 | Rutledge et al. | 345/161 |

MINIATURE ISOMETRIC JOYSTICK

RELATED APPLICATION DATA

The application is a continuation of U.S. application Ser. No. 08/104,777, filed Aug. 9, 1993 now U.S. Pat. No. 5,541,622 which is a continuation-in-part of commonly-assigned, U.S. application Ser. No. 08/096,485, filed Jul. 22, 1993 now abandoned, entitled KEYBOARD INTEGRATED POINTING DEVICE which is a division of U.S. application Ser. No. 07/557,546, filed Jul. 24, 1990, now U.S. Pat. No. 5,231,386, all incorporated herein by this reference.

FIELD OF THE INVENTION

The present invention relates generally to methods and apparatus for receiving manual user input for effecting directional control such as controlling cursor movement on a computer display screen or controlling movement of an apparatus such as a machine or robot. Isometric apparatus for manual analog input are sometimes known as "pointing devices" or "joysticks". More specifically, one aspect of the present invention includes an improved isometric joystick.

BACKGROUND OF THE INVENTION

Prior art pointing devices such as a joystick are known. What others have failed to appreciate is the ergonomic implications of mechanical and electrical null regions which must be traversed at the outset of a pointing operation. Using prior art devices, even those that are force-sensitive, a user gets no response to lateral displacement initially, until an electrode makes initial contact, for example, with an elastomeric resistive layer. The initial contact causes a step response, as resistance drops from infinity to a measurable value—a jump the user may not have anticipated or desired. Then, as force is increased, resistance falls rapidly, over some range, and finally falls more slowly with the application of additional force. All of this is disconcerting to a user for most applications. What is needed is to provide for pointing which is smoothly and consistently responsive to user input from the outset of the pointing operation by controlling such null regions.

Another disadvantage associated with prior art pointing devices is that they are not sensitive to vertical or z-axis force. Forces applied laterally, i.e., in the x-y axis plane, move a cursor in the corresponding direction on a computer or other information display screen. It would be desirable for a vertical force, e.g., down the shaft of a joystick-type controller, to produce a proportional signal. Such a signal could be used for example to control line width while drawing as a function of z-axis force on the pointing device. Z-axis force could also be used to control speed or acceleration of a cursor or apparatus being manipulated.

One prior art cursor control device is shown in U.S. Pat. No. 4,313,113 to David Thornburg. It employs four orthogonal variable-resistance pressure transducers, each transducer comprising a coordinate electrode spaced from a cooperating electrode, at least one of the electrodes being an elastomeric sheet material formed of a carbon loaded polyolefin. The path resistance through the transducer goes down as applied pressure goes up. However, the electrodes are spaced from the elastomeric layer, at rest, so that there is a mechanical and electrical null region before the system responds to a force input, followed by a step response when the electrode layers make initial contact. These characteristics are disconcerting to a user and therefore undesirable for accurate control.

U.S. Pat. No. 4,439,648 (Reiner et al.) is directed to a basic stand-alone joystick. The handle rests on a rigid pivot so that vertical force is ignored. The handle is coupled to an actuator portion spaced from all four switches, so there is a neutral or null region of displacement before any switch is closed. The switches are conventional, yielding only a binary signal, without regard to force.

U.S. Pat. No. 4,408,103 (Smith, III) discloses a miniaturized joystick adapted for mounting in a wristwatch. The joystick handle rests in a hollowed-out bearing surface so that none of the switches is actuated by a downward force on the handle. The switch actuating means is maintained spaced from all the switches by a resilient rubber sheet layer, so once again there is a neutral or null region of displacement before any of the switches is closed. The switches are miniaturized by forming them as interleaved electrodes on a PCB. When the handle is pivoted, an actuator pushes a conductive region of the resilient layer into contact with a corresponding switch. The switches each yield a binary output, so lateral force beyond an initial detect is ignored.

U.S. Pat. No. 4,246,452 (Chandler) shows another joystick type device, here having 16 possible output signals. The mechanism again employs a handle having a depending member that rests in a hollowed out bearing surface. Once again, the switches each provide a binary signal, independent of lateral force beyond a threshold force; vertical force is ignored; and, the actuator is spaced from the switches to provide a null region.

U.S. Pat. No. 4,680,577 (Straayer et al.) discloses a multipurpose keyswitch that serves both as a regular typing key, preferably located in the "home row" (asdf-jkl;) of a keyboard, as well as a force-sensitive pointing device. The use of strain gauges as shown therein for force sensing, however, is not commercially practical. Additionally, the recent rise in popularity of portable lap-top, notebook and even "palm-top" computers makes low profile methods essential. Straayer et al. also suggests activating the cursor positioning capabilities of the multipurpose keyswitch by first closing an additional keyswitch on the keyboard. A separate keyswitch for that purpose, however, is cumbersome to use. By comparison, the conventional mouse is essentially always "ON" for receiving pointing input. Moreover, keyboard space is at a premium in today's small portable computers, so an additional dedicated key is to be avoided if possible.

The parent application identified above discloses a keyswitch-integrated pointing device, for example, a computer keyboard typing key having force sensors coupled to it so that the typing key can also function somewhat like a joystick for controlling a cursor. Such a "multipurpose keyswitch" presents mechanical design challenges in order to maintain a normal "feel" or tactile response of the keyswitch for typing operations. In other words, the joystick feature must be carefully implemented so as to not interfere with the typing performance of the selected keyswitch.

Another problem with an input system that employs a multipurpose keyswitch is detecting when the user is "pointing". In conventional systems, such as the ubiquitous personal computer of the 1980's, the pointing device (typically a "mouse" separate from the keyboard) provided pointing information (cursor displacement data) through a dedicated mouse input port separate from the keyboard input port. That architecture segregates pointing data from typing data. Since the two input channels operate in parallel, both typing and pointing functions are always enabled. A multipurpose keyswitch can only provide one function at a time. Which function the user intends (typing or pointing) must somehow be determined. A separate switch to enable the pointing function is undesirable for reasons stated above. The need remains, therefore, for improvements in joystick methods and apparatus to provide accurate pointing operations and other benefits discussed below, all at low cost.

SUMMARY OF THE INVENTION

An object of the present invention is improved pointing operations through use of a novel joystick apparatus.

Another object is to detect when a user is operating a joystick without distracting the user.

Another object is to detect when a user is operating a joystick without using additional space on a keyboard or other input panel for a dedicated switch.

Another object is to detect when a user is using a joystick without distorting the response of the joystick.

Yet another object is to provide a joystick having an integrated switch.

Yet another object is to provide a joystick apparatus that has no null zone.

Yet another object is to improve preloading mechanisms useful in a joystick for improved accuracy and reliability at minimum production cost.

A further object is to provided a joystick that senses vertical (downward) pressure as well as lateral pressure.

A further object is to detect all forces applied to a joystick by a user.

Yet another object is to provide a miniature joystick located between the existing keys in the primary typing area of a standard keyboard without modifying any of the existing keys.

According to one aspect of the present invention, a method is disclosed for acquiring directional data for controlling cursor movement on a visual display screen such as a computer display screen. More specifically, in the context of a computer keyboard having a baseplate and an array of existing keyswitches mounted on the baseplate, the new method includes selecting a location on the baseplate intermediate the existing keyswitches; symmetrically arranging a plurality of force sensing elements around the selected location, so that the force sensing elements do not interfere with operation of the existing keyswitches; providing an actuator assembly positioned on top of the force sensing elements and supported solely by the force sensing elements, the actuator assembly having a shaft extending upward from the selected location for operation by a user's fingertip.

Additionally, a pre-loading force is applied to the actuator assembly along a Z axis normal to the base plate so as to force the actuator assembly against all of the force sensing elements in the absence of an external force on the shaft. The pre-loading force is selected so as to bias the force sensing elements to an intermediate operating point, so that an external deflecting force applied to the shaft angularly offset from the Z axis increases the force on at least one of the force sensing elements and decreases the force on an opposing element, thereby providing force information in at least two of the force sensing elements in response to said deflection force.

Another feature of the invention is an integrated switch coupled to a top end of the shaft for detecting presence of the user's fingertip contacting the shaft. While the user's fingertip is not detected, the force sensing elements are measured, i.e. electrical signals are acquired, such as analog resistance or voltage values, to acquire an indication of applied force, thereby acquiring bias force information. Then, while presence of the user's fingertip is detected, the force sensing elements are measured again to acquire an indication of applied force, thereby acquiring pointing force information. Finally, the bias force information and the pointing force information may be combined to form directional data for controlling cursor movement on the visual display screen.

The tip switch has the advantage of being unobtrusive in use. It detects when a user is pointing, as pointing requires pressing on the tip of the joystick. But the tip switch relieves the user from having to explicitly actuate a separate switch to enable pointing. Therefore, the cognitive load and physical step of first actuating a separate switch before pointing are removed, with corresponding savings of the user's time. Moreover, the tip switch is small and has little or no travel, so a user may not even be aware of its presence. The tip switch allows the computer or other target system to readily distinguish "time to bias" (when the user is not pointing) from "time to point."

Detecting when a user is pointing is important to low-cost pointing systems. Lower cost sensors and pointing mechanisms are prone to significant short and long term signal variations, even when they are not in use. An unobtrusive switch enables such variations, however extreme or sudden, to be effectively ignored, thereby avoiding erroneous results.

The invention further includes a miniature joystick apparatus. The joystick includes a generally flat, rigid base plate, although the known baseplate that exists in standard computer keyboards may be used for this purpose. A generally planar force-sensing assembly is employed in substantially parallel contact with the base plate. An actuator assembly is registered over the force-sensing assembly for applying forces to it, the actuator including an upright, rigid shaft coupled to an actuator plate. A preload spring urges the actuator plate and the base plate together, thereby maintaining the actuator plate in constant contact with the force-sensing means so that the apparatus exhibits no dead zone in use. The preloading assembly holds the assembly together in a manner in which does not cause binding. According to another aspect of the invention, a switch is integrated into the top end of the joystick shaft for detecting presence of the user's fingertip.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1A:
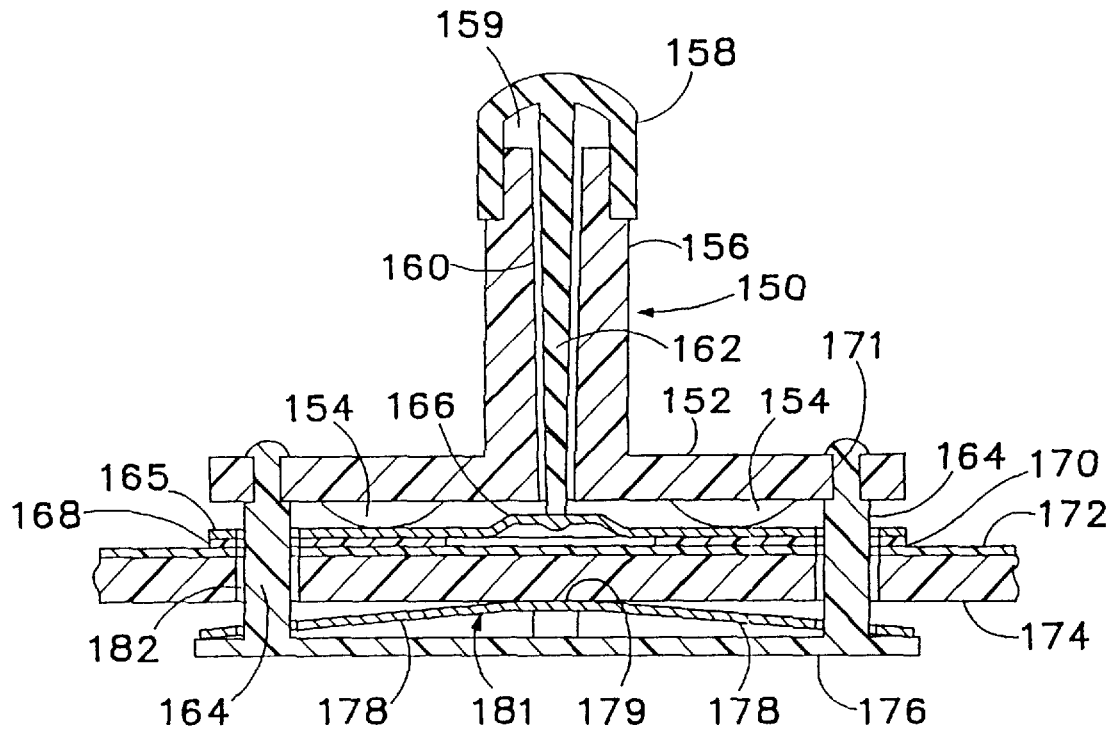
FIG. 1A is a cross-sectional view of an improved joystick mechanism having an integrated switch according to the present invention.

FIG. 1A shows a joystick mechanism according to the present invention. The joystick includes an actuator assembly 150 having a rigid shaft portion 156, a flexible rubber tip 158 coupled to a top end of the shaft, and a generally horizontal actuator plate 152 fixed to the bottom end of the shaft 156. The actuator plate and shaft preferably are formed of a sturdy, lightweight material such as a polymeric. They may be molded for volume production at low cost. The underside of the actuator plate includes several protruding actuator surfaces or "bumps" 154 further described below. These bumps may be integrally formed with the actuator plate or may be adhered thereto. Shaft 156 has a hollow core 160. The actuator assembly 150 sits on top of a rubber dome sheet 165; the rubber dome sheet sits on top of a sensor assembly 168; the sensor assembly 168 sits on top of a keyboard membrane 172; and, the entire assembly sits on top of a flat, rigid base plate 174. The joystick need not necessarily be implemented in a keyboard. In a stand-alone implementation, membrane 172 is not a keyboard membrane, but any similar structure arranged to provide a switch disposed generally below the actuator shaft, further described later. Preferably the switch is centered below the shaft.

Figure 1B:
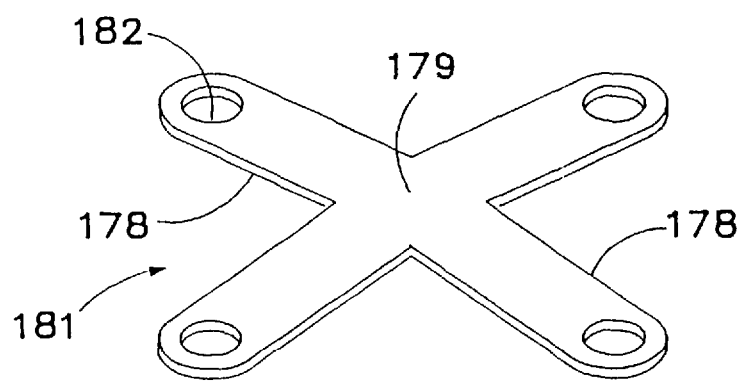
FIG. 1B is a perspective view of a leaf spring assembly useful for preloading in a joystick of the type illustrated in FIG. 1A.
Figure 1C:
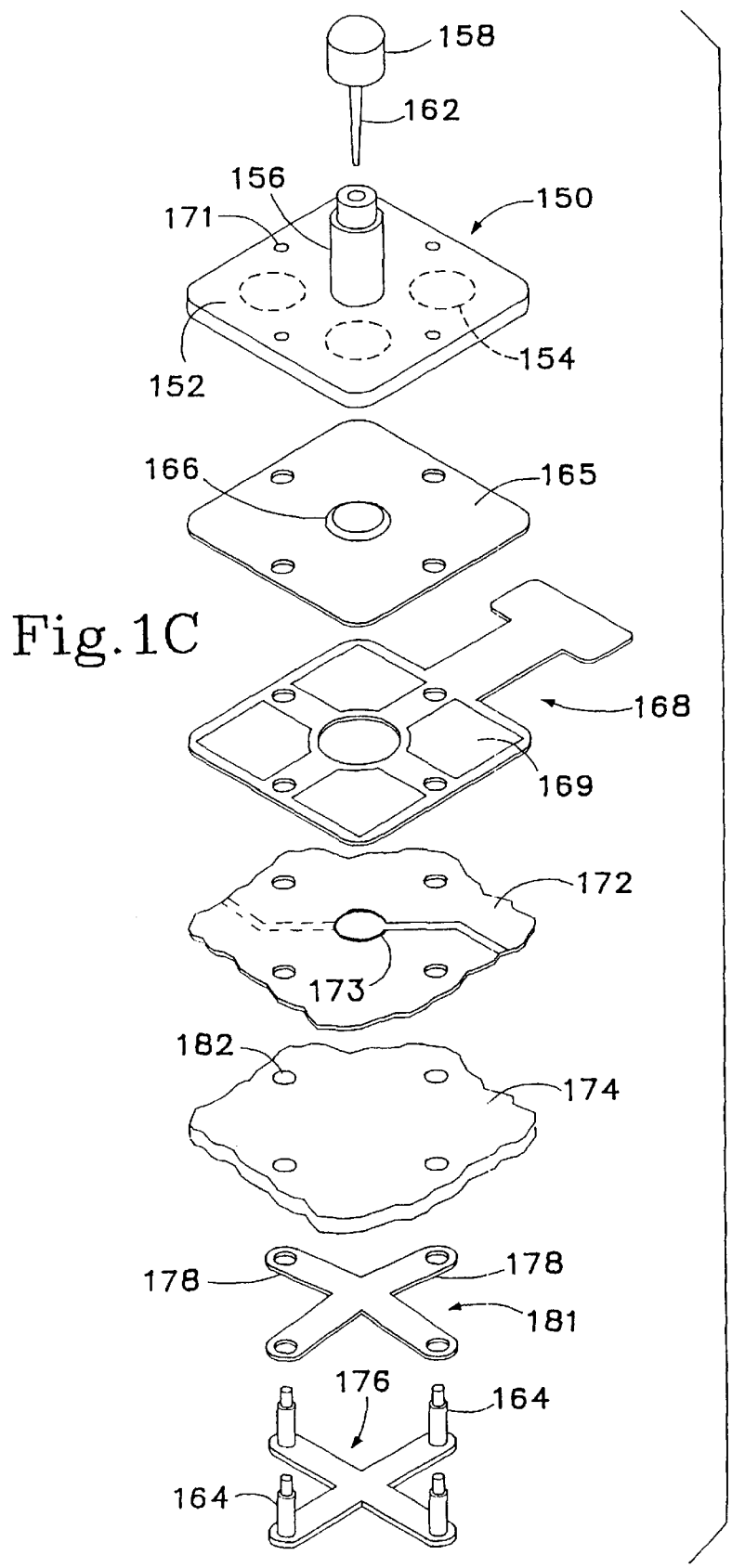
FIG. 1C is an exploded view of the joystick mechanism of FIG. 1A.

FIG. 1C is an exploded view of the joystick mechanism of FIG. 1A. Here, the reader can better appreciate the X-configuration of the back-up plate 176 although the shape is not critical. Sensor assembly 168 as illustrated comprises four independent sensor elements, for example sensor element 169, all formed on a common substrate. The rubber dome sheet 165 has a dome 166 formed therein which may include a recessed crater for contacting the membrane switch contacts 173.

A generally flat, rigid back-up plate 176 is disposed below and generally parallel to the base plate 174. Two or more mounting pins 164 extend upward from the back-up plate, through registered clearance holes 182, to the actuator plate 152 for fixedly interconnecting the back-up plate and the actuator assembly. Clearance holes 182 are sized to clear pins 164 both at rest and in use, and are formed in the base plate 174, spring 178, keyboard membrane 172, sensor assembly 168, and rubber dome sheet 165. Pins 164 extend into fitting engagement holes in the actuator plate 152. The pins may be fastened, for example, with heat staking or threaded engagement. A four-element leaf spring 181 with leaves 178 is located on the underside of base plate 174 between the base plate and the back-up plate 176. Spring 181 is compressed by back-up plate 176.

The pre-load spring 181, disposed between the back-up plate 176 and the base plate 174, is formed of a resilient material, preferably a light gauge stainless steel. During manufacture, the fastening pins 164 are installed so as to partially compress the pre-load spring. This arrangement holds the entire joystick assembly together without play or binding and, more particularly, applies a pre-load force to each of the force-sensing elements 169, thereby maintaining the actuator plate in constant contact with the force-sensing means so that the apparatus exhibits no dead zone in use. The force sensing elements preferably comprise force-sensitive resistors ("FSR"s).

Applying a pre-load force to the force-sensing elements is important for the following reasons. First, force-sensitive resistor or "FSR" elements, for example those commercially available from Interlink, Inc. of California, provide essentially infinite resistance when no force is applied to the element. When small initial force is applied, on the order of a hundred grams, the FSR elements instantly drop to an initial resistance on the order of a few hundred thousand ohms. This drastic change, or step response, is disconcerting to an operator and undesirable for most applications. The application of a pre-load force to the FSR device eliminates this initial step response problem.

Second, even after a small initial force is applied, FSR elements exhibit resistance to force characteristics that initially change very quickly and unpredictably, for example, exponentially and noisily, as force is further increased, moves into a more predictable region of operation. By arranging a pre-load force to bias the FSR elements into this more predictable region of operation, the devices will exhibit a more predictable response to external forces applied by the operator.

Preloading the sensors to a predetermined intermediate operating point also allows for differential sensing. To illustrate, an external lateral force applied to the joystick tip 158, for example, along the X or Y axis, results in a differential signal in that the force applied to one of the force-sensing elements 169 is increased while the force applied to the force-sensing element opposite the first force-sensing element is decreased. A force applied in any direction off the X or Y axis results in resistance to change in all four sensing elements. Note the absence of any pivot type supporting means as appear in a conventional joystick. According to the present invention, downward or Z-axis forces are coupled through the actuator surface bumps 154 to the sensor array 168. The present apparatus thereby measures the overall or net force applied by a user. A magnitude of the net force can be computed by summing the forces on all the sensors. The net applied force information is useful in many applications, for example, to control cursor speed, or to provide Z axis control. Increasing the apparent cursor speed in response to a greater operator applied force provides a natural and ergonomically efficient response.

The pre-load spring also affords the advantage of neutralizing manufacturing variations in the various components described, as well as obviating a pivot's high tolerance requirements. In use, the compressed spring takes up variations in thickness of the elements in between the backup plate 176 and the actuator 150 to avoid any play or wobble in the system. As long as the force-sensing elements are biased to some reasonable operating point, a processing unit coupled to the force-sensing array can be arranged to calibrate itself. Specifically, the processor can define zero force as whatever resistances are provided by the force-sensing elements in the absence of externally applied forces.

The joystick of FIG. 1A further includes an integrated switching mechanism described next. The switching mechanism comprises a rubber tip 158 coupled to the top end of shaft 156 for actuation by a user's fingertip. The rubber tip is fixed to a central depending plunger 162 that extends down through core 160 inside of shaft 156. The depending plunger 162 contacts the top of a low-travel rubber dome 166. Rubber dome 166 is pre-formed in rubber dome sheet 165. In response to a generally downward external force applied to the top of tip 158, the tip deforms downward, moving the depending plunger downward through the bore so that a lower end of the plunger 162 deforms the rubber dome 166, driving it downward through a clearance hole in the sensor assembly 168 into contact with a membrane switch 173 provided for that purpose in the keyboard membrane 172. See FIG. 1C.

In a typical membrane switch, two generally parallel membranes are separated by a third central spacing member. The membranes have conductive pads in facing opposition. The spacing member may be a thin plastic sheet material with holes in it, or it may comprise a thickened coating applied around the edge of the conductive pad on at least one of the membranes. In use, when the central tip of rubber dome 166 presses on the top membrane, it closes the gap and squeezes the conductive pads together, thereby closing the switch.

The joystick tip 158 is resilient and will retract depending member 162 upwards when finger pressure is removed, thereby opening the membrane switch. Downward displacement of depending member 162 is limited by the height of a gap 159 to a position adequate to actuate the membrane switch. Because of the small gap and resiliency of tip 158, only a slight force, hardly noticeable to the user, is necessary to close the switch. All additional force applied to tip 158 by the user's fingertip is transmitted through the actuator assembly to the sensor assembly to generate pointing data. Accordingly, the user is relieved from having to explicitly actuate a separate switch to enable pointing. Therefore, the cognitive load and physical step of first actuating a separate switch before pointing are removed, with corresponding savings of the user's time.

FIG. 1B is a perspective view of leaf spring assembly 181. The spring assembly includes four leaves 178, each leaf extending radially from a central pivot area 179 and having a clearance hole 182 at its distal end sized to clear a corresponding one of the mounting pins 164. The mounting pins thus hold the spring assembly positioned below the base plate, while individual leaves are free to bend in response to rocking movement of the actuator assembly 150. Another important aspect is the preload leaf spring 181 having a smooth, central pivot area 179. This arrangement helps to automatically balance the pre-loading forces among the sensor elements (i.e. when no external force is present). When a fingertip is placed on rubber tip 158, the leaf spring central pivot area allows the actuator assembly to pivot slightly around the preload or standby position. Note that the sensor assembly 168 may have fewer, for example three, sensor elements. It is preferred but not essential that the spring assembly have a number of leaves equal to the number of sensor elements. In the embodiment illustrated, the spring leaves are positioned in between the sensor elements, from a top view, rather than aligned with each of them.

Figure 2:
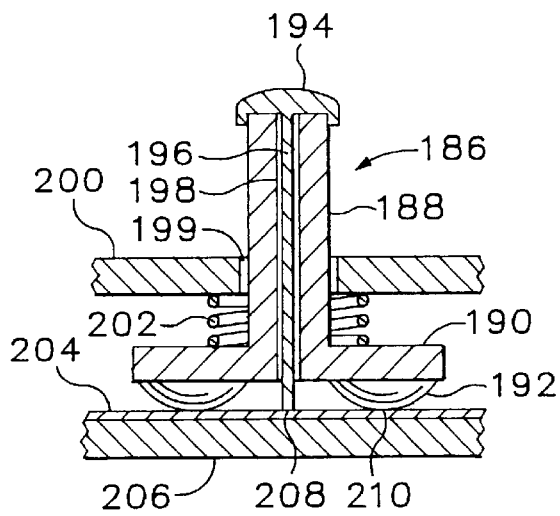
FIG. 2 is a cross-sectional view of an alternative joystick mechanism also having an integrated switch.

FIG. 2 shows an alternative joystick mechanism according to the present invention. In this embodiment, a sensor assembly 204 is disposed in parallel contact on top of a rigid base plate 206. An actuator assembly 186 includes an upright shaft 188 having a hollow bore 198 and a horizontal actuator plate 190 fixed to the shaft. A rigid top plate 200 is fixed in position in parallel to and spaced apart from base plate 206. Top plate 200 includes a central aperture 199 spaced to clear the shaft 188 and allow pivoting or rocking motion of the actuator assembly without contacting the top plate. The force sensor assembly 204 is pre-loaded by a compressed, helical pre-load spring 202 disposed between the top plate and the actuator plate 190. The actuator plate 190 includes contoured actuator surfaces, in this example rubber bumps 192, fixed to the underside of the actuator plate for contacting the sensor assembly 204. Specifically, each rubber bump preferably has a spherical segment shape and is positioned for tangentially contacting a corresponding one of the sensor elements of sensor assembly 204.

The top of shaft 188 has a cap 194 coupled thereto. The cap is formed of a pliable, resilient material such as a conductive rubber material and sized for fingertip operation, for example having a diameter in a range of approximately ⅛ to ½ inch. Cap 194 has a depending electrode 196 which extends down through bore 198 to a point 208 where it contacts the sensor assembly 204. Preloading of the force sensor assembly is achieved by compressing spring 202 between upper plate 200 and the actuator plate 190. The actuator plate transmits force to the rubber bumps 192 to maintain them in contact with the sensor assembly, for example at contact point 210. The bottom plate 206 or a surrounding framework is connected at points not shown in this drawing to upper plate 200 so as to form a "sandwich" arrangement that holds the joystick assembly together and provides compression of spring 202 when the assembly is at rest (i.e. in the absence of any external force).

In operation, a user's finger contacting cap 194 causes a detectable change in capacitance that can be detected by external circuitry via depending electrode 196, contact point 208, and sensor assembly 204. The external circuitry (not shown) is connected via the sensor assembly using means known in the art to detect a change in capacitance due to a fingertip. The user applies a fingertip to cap 194 and pushes on the joystick assembly, causing forces applied by the user to pass down through the actuator assembly into the sensors. No applied force or "travel" of the cap is necessary to detect presence of the user's finger. Accordingly, all applied forces are detected as force changes in the sensor assembly 204.

In implementations where the actuator assembly includes rigid bumps, for example the integrally formed bumps such as 154 in FIG. 1A, the rubber dome sheet 165 extends between the bump surfaces and the corresponding sensor elements 169 (FIG. 1C). This arrangement has been found to be advantageous in that the rubber dome sheet smoothly disperses or distributes forces applied through the actuator assembly to the sensor assembly. Alternatively, use of rubber bumps (or other compliant material), such as those illustrated in the embodiment of FIG. 2, obviate an intervening rubber sheet, and still provide good performance as the bumps themselves distribute applied forces over the sensor elements. The base plate 174 (206 in FIG. 2) provides a relatively rigid support to the underside of the sensor assembly 168 (204) in either embodiment so that forces applied through the actuator assembly are efficiently coupled to the sensor assembly. Helical spring 202 in FIG. 2 provides a preloading function similar to that provided by a compressive pad disclosed in the parent case identified above. We have found that the compressive pad, however, is subject to greater degradation over time.

Figure 3A:
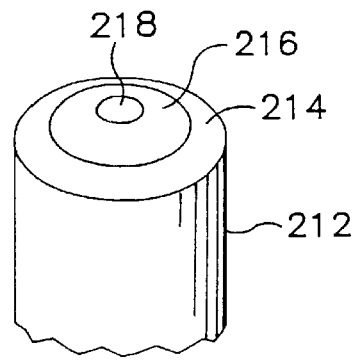
FIG. 3A is a perspective view of a joystick tip assembly having an integrated zero-travel switch.
Figure 3B:
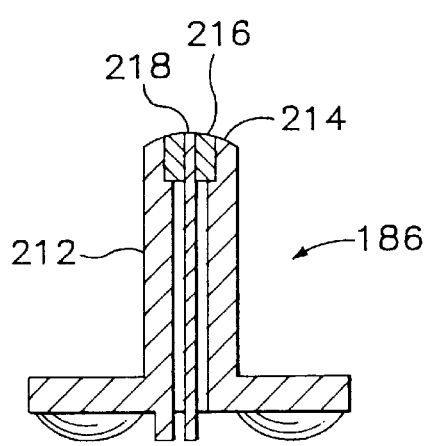
FIG. 3B is a cross-sectional view of the tip assembly of FIG. 3A as well as an actuator coupled to the tip assembly.

FIG. 3 is an enlarged, perspective view of a joystick tip. Such a tip may be applied, for example, to shaft 188 of FIG. 2 in place of the rubber cap 194. The joystick tip of FIG. 3 has a central electrode 218 separated from an outer electrode 214 by an insulating gap 216. A cross-sectional view of the tip appears as FIG. 3B. The outer shell 212 would enclose shaft 188. The central electrode 218 is coupled to a depending portion (not shown) that extends through the central core 198 (FIG. 2) for making electrical contact with a resistance detecting circuit (also not shown). An outer electrode 214 extends down the outside of shaft 188 to a contact point on a circuit board of sensor assembly (not shown).

In use, when a user's fingertip contacts the joystick tip, it bridges both electrodes over gap 216, causing a high resistance conductive path to form between the electrodes. This permits external circuitry which, again, is well known in the switch field, to detect the presence of the user's finger. In this way, an input system can detect when a user is operating a joystick without using additional space on a keyboard or other input panel for a separate dedicated switch. Since this "switch" does not move, all forces applied by the user are transmitted through the joystick tip and thus are available for analog input.

Figure 4:
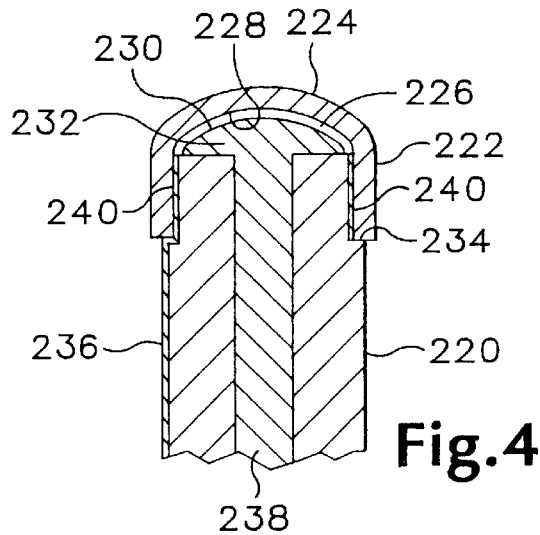
FIG. 4 is an enlarged cross-sectional view of an alternative joystick tip assembly having an integrated switch.

FIG. 4 is a cross-sectional view of a low-travel switching tip for a joystick. This type of joystick tip may be used, for example, in connection with a joystick having an actuator assembly similar to actuator 186 in FIG. 2. This switching tip comprises a hollow cap 224 formed of a pliable conductive material, such as a conductive rubber, fixed along its periphery to a joystick shaft 220, so that the cap covers the top end of the shaft. An interior electrode 232 covers a central portion of the top end of the shaft, and includes a depending portion 238 that extends downward through a central bore in the shaft. A top surface 230 of the interior electrode is spaced apart from an inside surface 228 of the cap 224, thereby forming a gap 226 therebetween. The interior electrode and the cap together form a normally-open switch. The inside surface 228 of the cap is coupled along 240 to a conductive path 236 which extends down along shaft 220 for connection to an electrical circuit (not shown). The depending portion of the interior electrode also is coupled to the circuit. When a user pushes on the cap 224, it will deform so as to close the gap 226, thus bringing the inside cap surface 228 into physical and electrical contact with the top surface 230 of electrode 232 to close the switch. Note that pressing on the cap 224 from an angle offset from vertical nonetheless will actuate the switch. As shown here, the conductive rubber cap 224 seats down on ledges 234 formed along the periphery of the shaft. These ledges maintain the cap spaced apart from the interior electrode at rest.

Figure 5A:
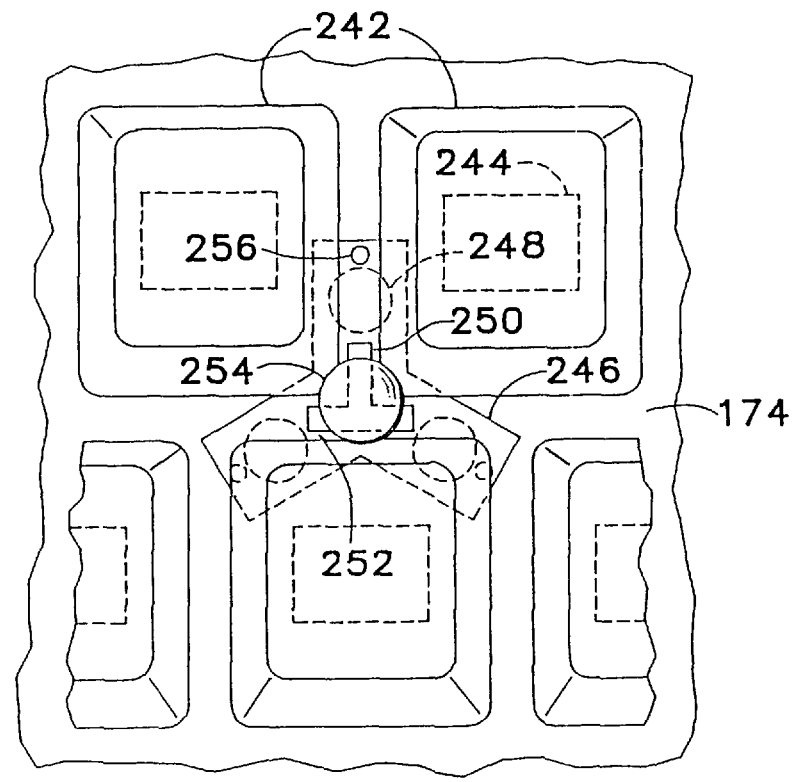
FIG. 5A is a partial top view of a keyboard having a joystick assembly mounted in between adjacent keyswitch guides of a keyboard.

FIG. 5A is a top view of a small, three-element joystick assembly embedded between three conventional keys in an otherwise conventional keyboard. This context gives an indication of the size of the joystick. The joystick assembly shown in this figure is similar to the joystick assembly of FIG. 1A with the switching assembly portions of that assembly removed. The keys illustrated may be located anywhere on the keyboard. Their particulars are known and are not important here. Each key includes a keycap, for example keycap 242, and a corresponding switch mechanism, e.g. 244, shown in phantom as the switch mechanisms are underneath the corresponding keycaps.

The joystick assembly comprises an actuator having a shaft 250 having, for example, an inverted T-shape in cross-section. A joystick tip 254 is disposed on a top end of the shaft for operation by a user's fingertip. The joystick tip may be similar to those described above such as the joystick tip of FIG. 3 or FIG. 4. The shaft couples the joystick tip to an actuator plate 246 fixed to a lower end of the shaft. The actuator plate has horizontal arms, for example arm 246, extending radially from the shaft in between the switching mechanisms of the neighboring keys and below the neighboring keycaps. The number of arms generally equals the number of discrete force sensors, each arm overlying a corresponding one of the sensors. However, the exact shape of the actuator plate (or arms) is not critical, as long as it does not contact neighboring structures. Such contact would interfere with accurate sensing of forces applied to the tip by a user. The number of sensors is flexible to a limited degree. At least two sensors are required to resolve a direction indicated by the user, e.g. for cursor control. Three sensors provide a measure of redundancy in case one of them fails. Size is the primary limiting factor in miniature applications. Moreover, more than four sensors provide little added benefit.

Figure 5B:
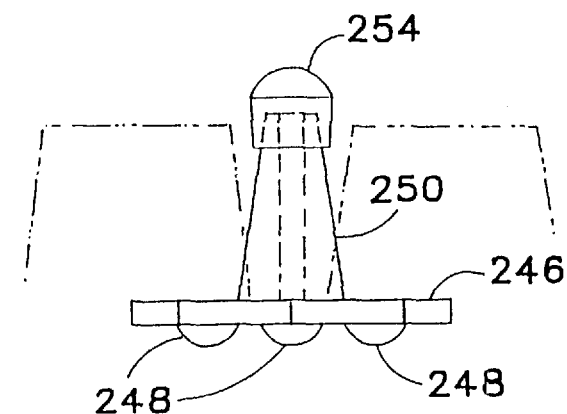
FIG. 5B is a side view of the actuator assembly of the joystick of FIG. 5A.

A clearance gap, e.g. 252 is maintained between the keycaps and the joystick shaft 250 to allow rocking motion of the joystick assembly without contacting the keycaps. As shown in the drawing, there are three circular sensor active areas, for example sensor area 248, shown in phantom as the sensors are positioned below the actuator plate. A mounting pin hole, for example hole 256, is provided adjacent the distal end of each actuator plate arm for assembling the mechanism as described above. FIG. 5B is a front view of the joystick actuator of FIG. 5A showing its positioning relative to adjacent keycaps ( shown in phantom). In FIG. 5B, actuator bumps or surfaces 248 protrude from the underside of the actuator plate 246 for contacting and transmitting forces to the force sensors (see FIG. 1A). The arrangement described provides for actuation of the joystick when needed without interfering with normal operation of the adjacent keys of the keyboard when the joystick is not needed. The shaft is sized so that the joystick tip extends only slightly above the top of the neighboring keycaps.

Figure 6:
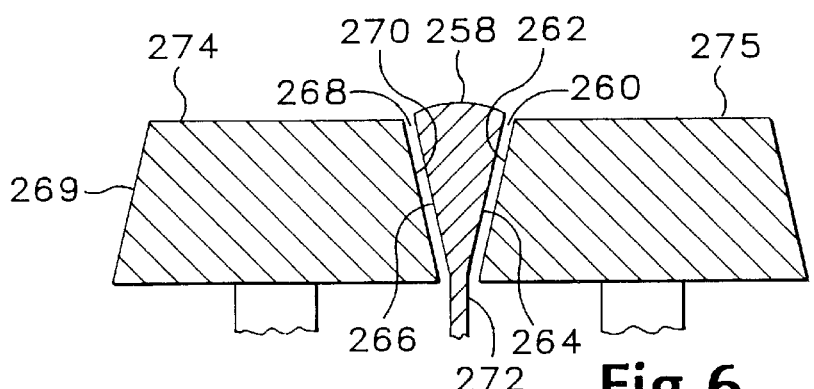
FIG. 6 is a side view of a tapered joystick shaft disposed between adjacent standard keycaps of a keyboard.

FIG. 6 is a side view of two adjacent keycaps 274, 275 with a joystick shaft 272 extending between them. The bottom end of the joystick shaft (not shown) is coupled to an actuator plate as described above. The shaft 272 may have a T-shape in cross-section, as illustrated in FIG. 5. Keycaps 274, 275 may be part of a computer keyboard, for example. The illustration is taken as viewed from the end of the keyboard, with the front of the keyboard (the long side closest to the user) toward the left of the drawing. In keyboards, the keycaps typically have sloped faces, for example keycap 274 has a sloped front face 269 and a sloped rear face 270. The front face often has a greater slope than the rear face. Keycap 275 is essentially identical to keycap 274.

Joystick shaft 272 tapers outwardly adjacent the top end so that the top end of the shaft forms an enlarged user surface 258 for operation by the user's fingertip. The user surface 258 may be part of the shaft 272, or may be formed by a rubber cap connected to the top end of the shaft. The shaft further includes sloped front and rear faces 266 and 264, respectively, each shaft face being sloped at an angle approximately complementary to the adjacent keycap face ( faces 270 and 262, respectively). The shaft faces 266 and 264 are spaced apart from the adjoining faces of the keycaps, thereby forming gaps 268 and 260, respectively. The gaps are sized to allow operation of the joystick without contacting the keycaps. This tapered fit on the joystick shaft allows the keycaps to be used without any modifications to the keycaps themselves. This reduces the number of modifications and the manufacturing costs required to install this joystick within a keyboard.

Figure 7A:
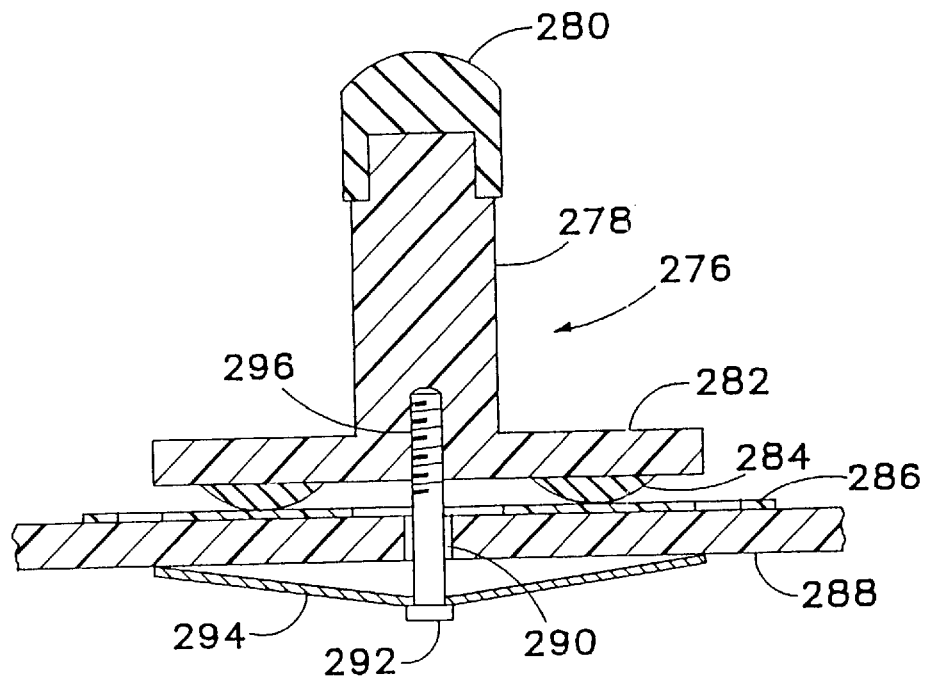
FIG. 7A is a cross-sectional view of another alternative joystick mechanism.

FIG. 7A shows an alternative embodiment of a isometric joystick assembly according to the present invention. This assembly comprises a rigid base plate 288; a sensor assembly 286 disposed in parallel contact with the base plate; and an actuator assembly 276 generally overlying the sensor assembly. Actuator assembly 276 includes a shaft 278, and a rubber tip 280 fixed to a top end of the shaft. The actuator assembly further includes a generally horizontal actuator plate 282, fixed to the bottom end of the shaft or integrally formed therewith. The actuator plate extends laterally over the sensor assembly. A series of actuator surfaces, for example bumps 284, protrude from the underside of the actuator plate and contact the sensor assembly 286. Each actuator surface contacts a corresponding sensor element on the sensor assembly. The bumps may be integrally formed with the actuator plate or separately formed and adhered to the plate. Preferably, the bumps are formed of a pliable material such as rubber for disbursing forces applied to the actuator assembly over the sensor elements.

The actuator assembly 276 is coupled to the sensor assembly 286 by a central fastener 292 which is secured to the actuator in a bore 296 sized to receive it. The fastener 292 compresses a Belleville spring 294 against the underside of base plate 288, thus squeezing the whole assembly together and preloading the rubber bumps against the sensor assembly 286. Fastener 292 passes through a clearance hole 290 that extends through the base plate 288 and the sensor assembly 286. Hole 290 is sized to allow rocking deflection of the actuator assembly without the fastener contacting the base plate.

Figure 7B:
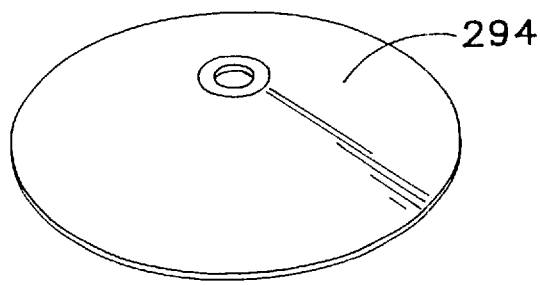
FIG. 7B is a top view of a spring useful for central preloading in a joystick of the type illustrated in FIG. 7A.

It is important to note that, with regard to all of the drawings, the exact preloading "spring" used can take a number of forms. These may include, for example, use of a foam rubber pad, a leaf spring assembly, a Belleville spring, a helical spring, etc. Some of the springs have some advantages in providing pivot points or more uniform self-balancing operation. The four-element leaf spring shown in FIG. 1 and the Belleville spring shown here in FIG. 7 are very good at the self-leveling aspect.

An important feature illustrated in FIG. 7A is that the preload is applied to the actuator assembly 276 at a central point. We refer to this method as "central preloading". The apparatus of FIG. 1A illustrates "radial preloading" in that the preloading force is applied adjacent the peripheral edges of the actuator plate. Central preloading has the advantages of reduced manufacturing costs and fewer parts, as only one fastener 292 is required. While the apparatus of FIG. 7A as illustrated does not include a switch, a switching mechanism could be added similar to any of the switching mechanisms of FIGS. 1A, 2, 3 or 4.

Figure 8:
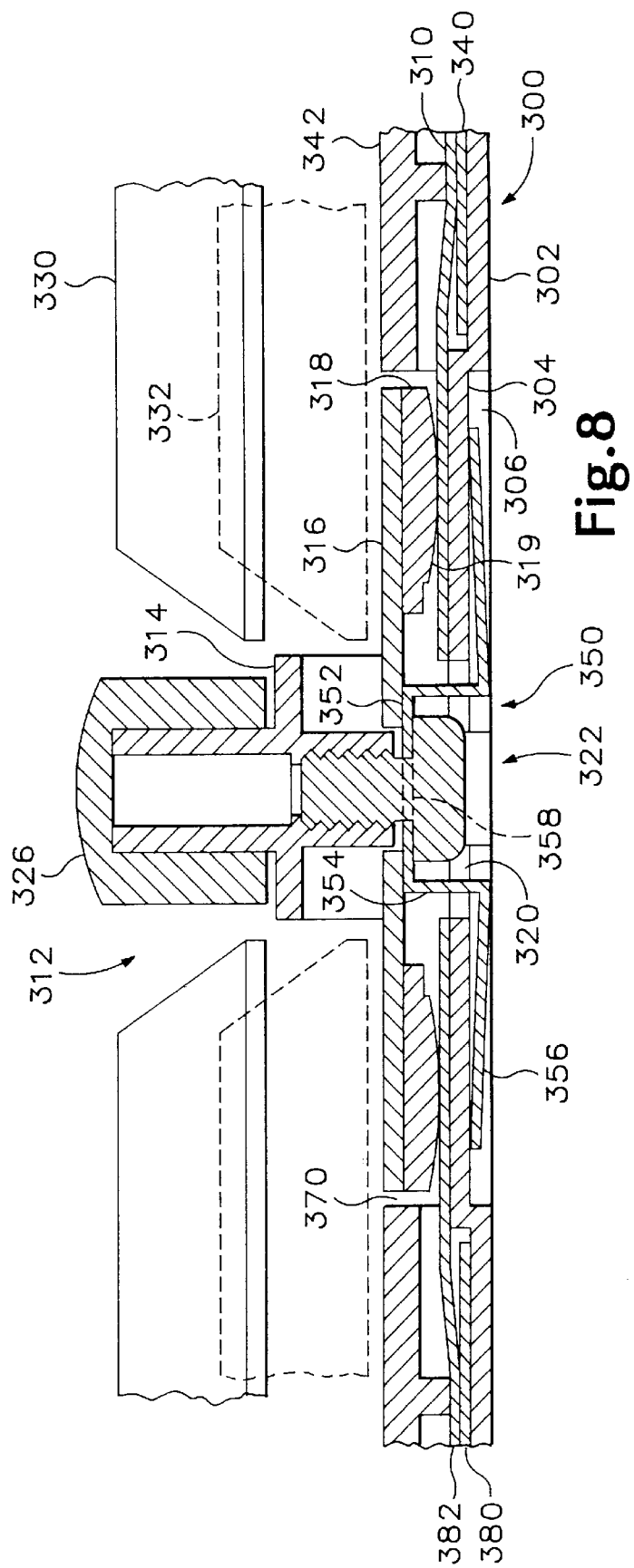
FIG. 8 is a cross-sectional view of an alternative embodiment of an isometric joystick according to the present invention.

FIG. 8 is a cross-sectional view of an alternative embodiment of an isometric joystick according to the present invention. Referring to FIG. 8, the joystick is generally symmetric, and is assembled onto a generally flat base plate 300. A central region of the base plate 304 is offset above a lower peripheral region 302 of the base plate, so as to form a recessed 306 sized to accommodate a spring described later. A generally flat, pliable sensor assembly 310 lies on top of base plate 300. Although separate, discrete sensor elements may be used, preferably a plurality of sensor elements are formed in a unitary sensor assembly.

An actuator assembly 312 includes a shaft assembly 314 and actuator plate 316. A cap 326 is fixed to a top end of the shaft 314. Cap 326 preferably is formed of a pliable material such as rubber, as discussed above. The actuator plate 316 is fixed to a bottom end of the shaft, and extends generally horizontally in parallel to the base plate 300. An actuator pad 318 is disposed along the underside of the actuator plate for contacting the sensor assembly 310. Accordingly, the actuator plate includes a number of actuator surfaces or bumps 319 equal to the number of discrete force sensor elements, each of the actuator surfaces 319 being registered over a corresponding one of the sensor elements. The base plate 300 includes a central aperture 320.

The spring assembly 350 comprises a central portion 352, an offset portion 354 and a plurality of peripheral arms 356. Spring assembly 350 is generally symmetrical. It may include, for example, three or four arms symmetrically arranged about the center of the joystick assembly. The central portion 352 includes a central aperture 358. Mounting means such as a screw 322 extends through the aperture 358 and into a central bore on the lower end of the shaft 314. A head of the screw extends over the spring central portion 352 so that the screw 322 secures the spring assembly against the underside of the actuator plate 316 and also secures the actuator plate to the bottom end of the actuator shaft 314. The offset portions 354 of the spring assembly 350 extend generally downward and through the aperture 320 to locations below the base plate 300, yet within the recessed 306. Arms 356 extend radially outward from the offset portions 354 and are biased upward. The arms 356 contact the underside of the base plate 300 thereby urging the actuator assembly 312 into constant contact with the sensor assembly 310 via the actuator surfaces 319. This assembly has the advantage of providing a "low profile" i.e., a minimum overall height of the joystick thereby permitting its use in low profile keyboards, such as those found in laptop or notebook computers.

A pair of keycaps, for example keycap 330, are illustrated to either side of the joystick assembly, to show the relative positioning of the joystick. The keycaps are illustrated in their normal upright position, and also are shown in phantom by dashed lines 332 in their lower or actuated position. The keycap is free to travel up and down without contacting any part of the joystick assembly. Conversely, the joystick assembly may be operated without contacting the neighboring keycaps. The actuator plate 316 is spaced apart from surrounding structures by a gap 370 so that slight motion of the actuator assembly is permitted without contacting the surrounding structures. In the case of a computer keyboard, a switch membrane 380 generally overlies the base plate 300. The membrane 380 is removed in the region of the joystick assembly. However, the sensor assembly 310 may include a peripheral region 382 which extends over the membrane 380 for connecting the sensor assembly to electrical circuits.

Having illustrated and described the principles of my invention in a preferred embodiment thereof, it should be readily apparent to those skilled in the art that the invention can be modified in arrangement and principles. We claim all modifications of the accompanying claims.

We claim:

1. A low-travel switching joystick apparatus comprising:
   a rigid shaft;
   a pliable, hollow cap covering a top end of the shaft, the cap having an electrically conductive interior surface, and being coupled to the shaft along a peripheral edge of the cap;
   an electrically conductive interior electrode overlying a central portion of the top end of the shaft and spaced apart from the said interior surface of the cap so as to permit generally downward deformation of the cap for establishing contact between the said interior surface and the interior electrode in response to pressure applied to the cap by the user's finger; and integrated switch means coupled to the interior electrode for detecting presence of the user's fingertip contacting the cap, the interior electrode having a depending portion extending through the shaft for electrical connection of the switch means.

2. The joystick apparatus according to claim 1 further including a ledge formed along a periphery of the shaft upon which the peripheral edge of the cap is seated.

3. In a computer keyboard having a baseplate and an array of existing keyswitches mounted on the baseplate, a method of acquiring electrical signals responsive to forces applied by a user for controlling cursor movement on a visual display screen, the method comprising:

selecting a location on the baseplate intermediate the existing keyswitches;

providing a plurality of force sensing elements, each such element having an electrical characteristic that varies in response to force applied to said element;

symmetrically arranging the force sensing elements around the selected location, so that the force sensing elements do not interfere with operation of the existing keyswitches;

providing an actuator assembly positioned on top of the force sensing elements and supported solely by the force sensing elements, the actuator assembly having a shaft extending upward from the selected location in between the existing keyswitches for operation by the user's fingertip;

maintaining a pre-loading force on the actuator assembly generally along a vertical axis normal to the baseplate so as to force the actuator assembly against all of the force sensing elements in the absence of an external force on the shaft, whereby any force applied to the shaft by the user's fingertip produces a responsive change in the electrical characteristic of at least one of the force sensing elements without overcoming a null zone of operation;

providing an integrated switch coupled to the shaft for detecting a force applied by the user's fingertip contacting the shaft; and selecting the pre-loading force so as to bias the force sensing elements to a desired intermediate operating point, so that an external deflecting force applied to the shaft angularly offset from the Z axis increases the force on at least one of the force sensing elements and decreases the force on an opposing element, thereby providing differential electrical signals for cursor control in response to said deflection force.

4. A method according to claim 3 further comprising the steps of:

coupling the integrated switch coupled to a top end of the shaft for detecting presence of the user's fingertip contacting the top end;

while the user's fingertip is not detected, measuring the force sensing elements to acquire an indication of applied force, thereby acquiring bias force information;

while presence of the user's fingertip is detected, measuring the force sensing elements to acquire an indication of applied force, thereby acquiring pointing force information; and combining the bias force information and the pointing force information to form directional data for controlling cursor movement on the visual display screen.

5. In a computer keyboard having a baseplate and an array of existing keyswitches mounted on the baseplate, a method of acquiring electrical signals responsive to forces applied by a user for controlling cursor movement on a visual display screen, the method comprising:

selecting a location on the baseplate intermediate the existing keyswitches;

providing a plurality of force sensing elements, each such element having an electrical characteristic that varies in response to force applied to said element;

symmetrically arranging the force sensing elements around the selected location, so that the force sensing elements do not interfere with operation of the existing keyswitches;

providing an actuator assembly positioned on top of the force sensing elements and supported solely by the force sensing elements, the actuator assembly having a shaft extending upward from the selected location in between the existing keyswitches for operation by the user's fingertip;

maintaining a pre-loading force on the actuator assembly generally along a vertical axis normal to the baseplate so as to force the actuator assembly against all of the force sensing elements in the absence of an external force on the shaft, whereby any force applied to the shaft by the user's fingertip produces a responsive change in the electrical characteristic of at least one of the force sensing elements without overcoming a null zone of operation;

providing an integrated switch coupled to the shaft for detecting a force applied by the user's fingertip contacting the shaft;

coupling the integrated switch coupled to a top end of the shaft for detecting presence of the user's fingertip contacting the top end;

while the user's fingertip is not detected, measuring the force sensing elements to acquire an indication of applied force, thereby acquiring bias force information;

while presence of the user's fingertip is detected, measuring the force sensing elements to acquire an indication of applied force, thereby acquiring pointing force information; and combining the bias force information and the pointing force information to form directional data for controlling cursor movement on the visual display screen.

6. A method of acquiring electrical signals responsive to forces applied by a user for controlling cursor movement on a visual display screen, the method comprising:

providing a plurality of force sensing elements, each such element having an electrical characteristic that varies in response to force applied to said element;

symmetrically arranging the force sensing elements around a selected location;

providing an actuator assembly positioned on top of the force sensing elements and supported solely by the force sensing elements, the actuator assembly having a shaft extending orthogonally from the selected location for operation by the user's fingertip;

maintaining a pre-loading force on the actuator assembly generally along a vertical axis normal to the force sensing elements so as to force the actuator assembly against all of the force sensing elements in the absence of an external force on the shaft;

providing an integrated switch coupled to a top end of the shaft for detecting a force applied by the user's fingertip contacting the shaft; and sizing and arranging the shaft relative to the existing keyswitches so that the shaft is substantially inaccessible to the user except through the top end, thereby substantially preventing the user from applying force to the actuator assembly without actuating the integrated switch.

7. A method according to claim 6 further comprising the step of selecting the preloading force so as to bias the force sensing elements to a desired intermediate operating point, so that an external deflecting force applied to the shaft angularly offset from the Z axis increases the force on at least one of the force sensing elements and decreases the force on an opposing element, thereby providing differential electrical signals for cursor control in response to said deflection force.

8. A method according to claim 7 further comprising the steps of:

while the user's fingertip is not detected, measuring the force sensing elements to acquire an indication of applied force, thereby acquiring bias force information;

while presence of the user's fingertip is detected, measuring the force sensing elements to acquire an indication of applied force, thereby acquiring pointing force information; and combining the bias force information and the pointing force information to form directional data for controlling cursor movement on the visual display screen.

* * * * *

UNITED STATES PATENT AND TRADEMARK OFFICE
CERTIFICATE OF CORRECTION

PATENT NO. : 5,889,507                                          Page 1 of 1
DATED : March 30, 1999
INVENTOR(S) : Engle et al.

It is certified that error appears in the above-identified patent and that said Letters Patent is hereby corrected as shown below:

Column 12,
Line 53, "modifications of" should read -- modifications coming within the spirit and scope of --

Signed and Sealed this

Twenty-first Day of May, 2002

Attest:

Attesting Officer

JAMES E. ROGAN
*Director of the United States Patent and Trademark Office*